United States Patent [19]
Götz

[11] 3,750,555
[45] Aug. 7, 1973

[54] INSTALLATION FOR PREVENTION OF DRAFT IN THE INTERIOR SPACE OF MOTOR VEHICLES

[75] Inventor: Hans Götz, Sindelfingen, Germany

[73] Assignee: Daimler-Benz Aktiengesellschaft, Stuttgart-Unterturkheim, Germany

[22] Filed: May 20, 1971

[21] Appl. No.: 145,422

[30] Foreign Application Priority Data
May 21, 1971 Germany.................. P 20 24 793.2

[52] U.S. Cl.................................. 98/2.01, 98/2.18
[51] Int. Cl............................................. B60h 1/24
[58] Field of Search.................... 98/1.5, 2.01, 2.18, 98/2.19

[56] References Cited
UNITED STATES PATENTS

| 2,428,283 | 9/1947 | Kemper | 98/1.5 |
| 3,143,951 | 8/1964 | Watt | 98/2.18 |
| 3,286,617 | 11/1966 | Shirk | 98/2.18 |
| 3,330,199 | 7/1967 | Campbell | 98/2.01 |
| 3,392,654 | 7/1968 | Graier | 98/2.01 |

*Primary Examiner*—Meyer Perlin
*Attorney*—Craig, Antonelli & Hill

[57] ABSTRACT

An installation for preventing a draft in the interior space of motor vehicles equipped with air discharge openings in the vehicle rear section to provide a ventilation, in which the discharge openings are provided with an automatically controllable closure flap.

13 Claims, 2 Drawing Figures

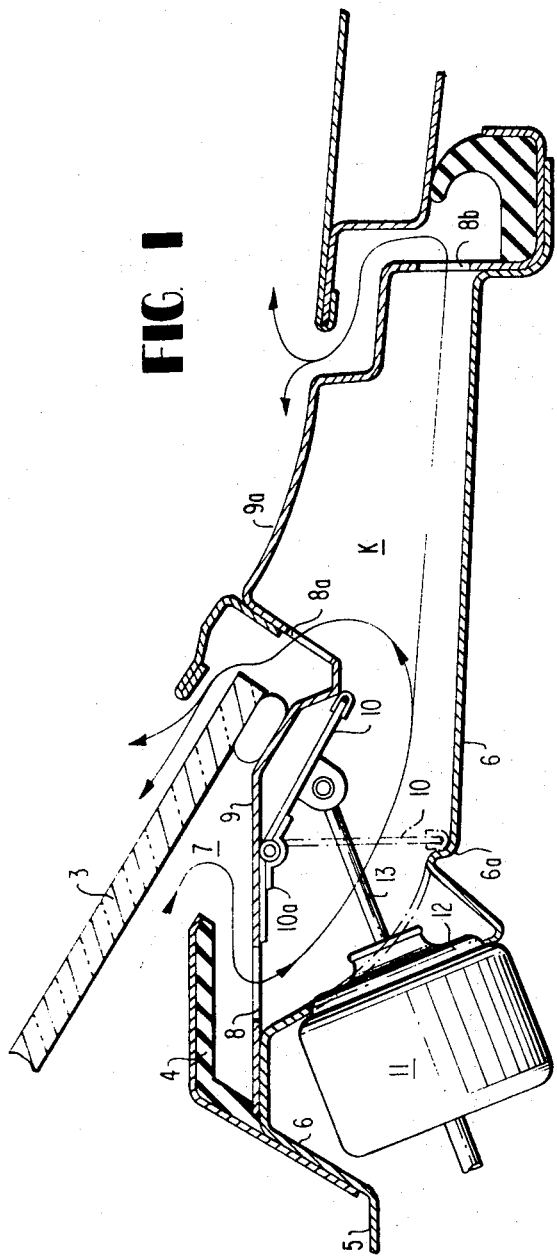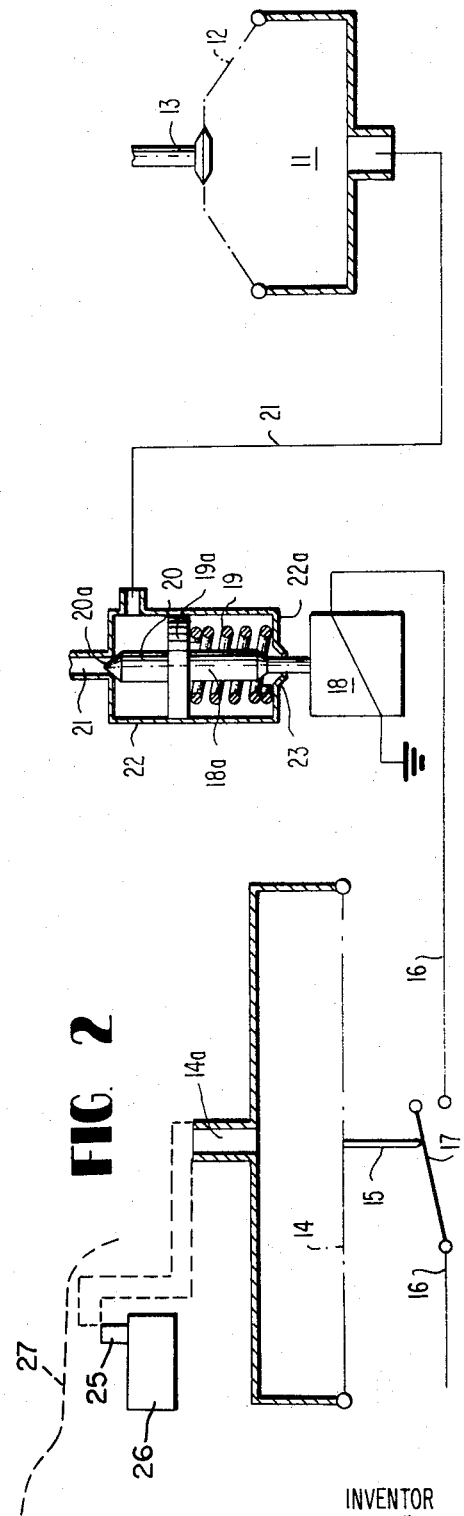
INVENTOR
HANS GÖTZ
BY Craig, Antonelli & Hill
ATTORNEYS

INSTALLATION FOR PREVENTION OF DRAFT IN THE INTERIOR SPACE OF MOTOR VEHICLES

The present invention relates to an installation for the prevention of drafts in the interior space of motor vehicles, which are provided with air discharge openings in the vehicle rear section.

With opened windows or opened sliding roof, a vacuum is produced during the drive in the interior space of motor vehicles. It may thereby happen that the vacuum within the area of the air discharge apertures in the outer cover panels of the body is smaller than the vacuum in the interior space of the vehicle. The consequence of such a pressure distribution is a reverse air flow from the outside toward the inside through the air discharge apertures which may lead to a considerable draft annoyance, especially for the persons present in the rear seats of the vehicle.

The present invention is concerned with the task to avoid this disadvantage of such types of ventilation installations.

An installation for the prevention of drafts in the interior space of motor vehicles is therefore proposed which are equipped with air discharge apertures in the vehicle rear section, whereby according to the present invention, the air discharge openings or apertures are equipped with an automatically controllable closure valve or flap which is actuatable preferably in dependence on the pressure difference between the air in the vehicle interior and the outside air.

According to a preferred construction of the present invention, a pressure-measuring device, for example a pressure diaphragm is arranged in the vehicle interior, which is adapted to be acted upon on one side with the pressure of the outside air and, on the other, with the pressure in the vehicle interior and whose movement, in turn, actuates a microswitch.

Advantageously, the microswitch is electrically connected with a magnetic switch for a vacuum element acting on the closure valve or flap.

The free end of the vent line of a fuel tank arranged in the vehicle rear section may thereby advantageously serve as measuring place for the outside pressure.

It is additionally advantageous if the auxiliary force element is adapted to be connected with a vacuum source, for example, with a suction pipe of an internal combustion engine, by means of a line and by way of the magnetic switch or shifting member.

Accordingly, it is an object of the present invention to provide an installation in connection with motor vehicle ventilation systems of the type described above which avoids by simple means the aforementioned shortcomings and drawbacks encountered in the prior art.

Another object of the present invention resides in an installation for preventing the occurrence of drafts in the interior space of motor vehicles which is not only simple in construction but also reliable in operation to achieve the intended goals.

A further object of the present invention resides in an installation which protects passengers seated in the rear seat of a motor vehicle from draft annoyances in connection with ventilation systems of the type described above.

These and further objects, features and advantages of the present invention will become more obvious from the following description when taken in connection with the accompanying drawing which shows for purposes of illustration only, one embodiment in accordance with the present invention, and wherein:

FIG. 1 is a partial longitudinal cross-sectional view through the lower rear window area of a passenger motor vehicle; and FIG. 2 is a schematic diagram of the control system for the closure flap of FIG. 1.

Referring now to the drawing wherein like reference numerals are used throughout the two views to designate like parts, and more particularly to FIG. 1, in front of the lower edge of the rear window 3 of a passenger motor vehicle, an approximately horizontally extending cover rail 4 is extended upwardly from the part of the vehicle rear wall 6 serving as hat storage surface 5 and bent off at the upper end thereof. Slots 7 are cut-in between the rear end of the cover rail 4 and the rear window pane 3 which serve for the air discharge.

The slots 7 between rear window 3 and hat storage surface 5 lead to air discharge apertures 8 which below the cover rail 4 are cut into the sheet metal plate or element 9 which encloses the lower end of the rear window. The rear wall section 9a of the sheet metal element 9 forms together with the bent-off portion of the vehicle rear wall 6 of the air channel or duct K, the air thereby escapes out of the vehicle interior space along the lower edge of the rear window 3 through the apertures 8a and 8b of the duct K and through the rear lid gap, or in case of corresponding pressure conditions, fresh air can flow into the vehicle interior space through the same. In order to prevent this inflow, a flap 10 for closing the duct K is pivotally mounted at the sheet metal member 9.

The flap 10 normally opens up the passage through the channel or duct K under the pressure of a leg spring 10a. In this flap position, the air can flow unpairedly through the duct K. In the closed condition, indicated in dash and dotted line, the flap 10 abuts sealingly with its outer edge carrying a sealing strip against an edge portion 6a of the bent rear wall 6.

The flap movement is initiated by an auxiliary force element 11 whose working medium is a vacuum acting on a diaphragm 12. The vacuum is taken off appropriately from the suction pipe of the engine in case of a motor vehicle driven by an internal combustion engine. The force transmitted by the diaphragm 12 is thereby greater than that of the leg spring 10a.

A rod 13 projecting from the diaphragm 12 is pivotally connected to the flap 10. A double-acting pressure diaphragm 14 adapted to be acted upon on both sides thereof (FIG. 2) brings about as pressure-measuring device the control of the flap movement, which diaphragm 14 is arranged in the vehicle passenger space.

One of the two measuring places, which should correspond at all times approximately to the outside pressure (14a), is arranged within the area above the free end of the water-protected vent line 25 of the fuel tank 26 installed into the rear section 27 of the vehicle. The measuring place for the pressure in the vehicle interior space is disposed approximately at a tunnel side wall or at foot height of the rear seat box. In order to avoid error sources, the measuring places are arranged not far from one another. The respective position of the measuring stations is not illustrated in detail in the drawing for the sake of simplicity.

The pressure diaphragm 14 is acted upon on one side by way of the connecting pipe 14a with the outside pressure from the aforementioned measuring place whereas its other side is exposed to the pressure in the rear area of the vehicle interior space. A rod 15 (FIG. 2) projecting outwardly from the center of the diaphragm 14, closes a microswitch 17 connected into an electric line 16 in case of the occurrence of pressure differences.

With a closed microswitch 17, a magnetic switch or shifting element 18 is fed with current, thereby energizing the latter. The armature 18a of the magnetic switch 18 is constantly under the stress of a spring 19. A plunger 20 projecting from the armature 18a closes or opens, depending on the energization of the magnetic switch 18, a vacuum line 21 from the suction pipe of the internal combustion engine of the motor vehicle to the auxiliary force element 11. On the other hand, the outside air cannot enter into the vacuum line 21 by way of the housing 22 of the spring plate 19a carried by the armature 18a since the armature 18a is tapered conically in its portion near the magnet 18 and sealingly abuts on the conically shaped opening 23 of the housing bottom 22a in the position of the armature 18a retracted into the magnet by energization of the latter.

When a normal air pressure has established itself in the rear area of the vehicle interior space, the pressure diaphragm 14 returns into its center position. As a result thereof, the microswitch 17 is opened and the electric line 16 is interrupted. The armature 18a of the now nonenergized magnetic switch 18 is pressed upwardly by the spring 19 and the plunger 20 with its conically shaped tip 20a closes the vacuum line 21. Outside air with a normal pressure is now supplied to the auxiliary force element 11 through the opening 23 by way of the vacuum line 21. The diaphragm at the auxiliary force element 11 is prestressed outwardly and pivots the closure flap 20 into its opened position.

In case of a pressure drop determined by the two measuring stations, i.e., in the case of the occurrence of a vacuum in the vehicle rear area, which may occur already at lower driving velocities as a result of slightly opened windows or of a slightly opened sliding roof, the magnetic switch 18 is energized by the deflection of the diaphragm 14 and by the resulting closure of the energizing circuit and its armature 18a is attracted opposite the force of the spring 19. As a result thereof, the vacuum reaches the auxiliary force element 11 through the line 21. The inversion of the diaphragm 12 of the auxiliary force element 11 cuased thereby, in turn causes a pivoting of the closure valve 10 tightly or sealingly against the abutment edge 6a. The air flow from the outside into the rear area of the vehicle is thereby no longer possible.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An installation for the prevention of drafts in the interior space of motor vehicles which are provided with air discharge aperture means in the vehicle rear section, characterized in that the air discharge aperture means are provided with an automatically controllable closure flap means, and control means for automatically controlling the closure flap means in dependence on the pressure difference between the air in the vehicle interior and the outside air, said control means including a pressure-measuring means in the vehicle interior which is adapted to be acted upon on one side with outside pressure and the other with the pressure in the vehicle interior and whose movement actuates a switch means.

2. An installation according to claim 1, characterized in that said pressure-measuring means is a pressure diaphragm and said switch means is a microswitch.

3. An installation according to claim 1, characterized in that said switch means is electrically and operatively connected with a magnetic shifting means for an auxiliary force element acting on the closure flap means.

4. An installation according to claim 3, characterized in that the magnetic shifting means includes an armature and a spring biasing the armature, the auxiliary force element with a non-energized magnetic shifting means being adapted to be acted upon with outside pressure as a result of the closure movement of the armature initiated by the spring engaging at the armature.

5. An installation according to claim 4, characterized in that said armature is connected with a plunger cooperating with a line leading to the vacuum source.

6. An installation according to claim 3, characterized in that the vehicle rear section is provided with a fuel tank having a vent line extending therefrom, the vent line being provided with a free end serving as a measuring place for the outside pressure, and means for conducting the outside pressure from the free end to the pressure measuring means.

7. An installation according to claim 6, characterized in that the auxiliary force element is adapted to be connected with a vacuum source by a line and by way of the magnetic shifting means.

8. An installation according to claim 7, characterized in that said vacuum source is the suction pipe of an internal combustion engine.

9. An installation according to claim 7, characterized in that the magnetic shifting means includes an armature and a spring biasing the armature, the auxiliary force element with a non-energized magnetic shifting means being adapted to be acted upon with outside pressure as a result of the closure movement of the armature initiated by the spring engaging at the armature.

10. An installation according to claim 9, characterized in that said armature is connected with a plunger cooperating with a line leading to the vacuum source.

11. An installation according to claim 10, characterized in that said pressure-measuring means is a pressure diaphragm and said switch means is a microswitch.

12. An installation according to claim 11, characterized in that said vacuum source is the suction pipe of an internal combustion engine.

13. An installation according to claim 1, characterized in that the vehicle rear section is provided with a fuel tank having a vent line extending therefrom, the vent line being provided with a free end serving as a measuring place for the outside pressure, and means for conducting the outside pressure from the free end to the pressure measuring means.

* * * * *